(No Model.) 2 Sheets—Sheet 2.

J. L. KAIL.
BRAN COMPRESSOR.

No. 287,133. Patented Oct. 23, 1883.

Witnesses:
C. L. Carman
H. C. McArthur

Inventor.
John L. Kail

Per
Attorney.
H. Harrison

UNITED STATES PATENT OFFICE.

JOHN L. KAIL, OF BOONE, IOWA.

BRAN-COMPRESSOR.

SPECIFICATION forming part of Letters Patent No. 287,133, dated October 23, 1883.

Application filed July 5, 1883. (No model.)

*To all whom it may concern:*

Be it known that I, JOHN L. KAIL, a citizen of the United States, residing at Boone, in the county of Boone and State of Iowa, have invented certain new and useful Improvements in Bran-Compressors, of which the following is a specification, to wit:

This invention relates to an improvement in bran-compressors; and it consists in certain peculiarities of construction and arrangement whereby the bran is automatically fed into the machine, and, when the proper weight is had, automatically shut off and compressed, substantially as will be hereinafter more fully set forth.

In order to enable others skilled in the art to which my invention relates to make and use the same, I will now proceed to describe its construction and operation, referring to the accompanying drawings, in which—

Figure 1:
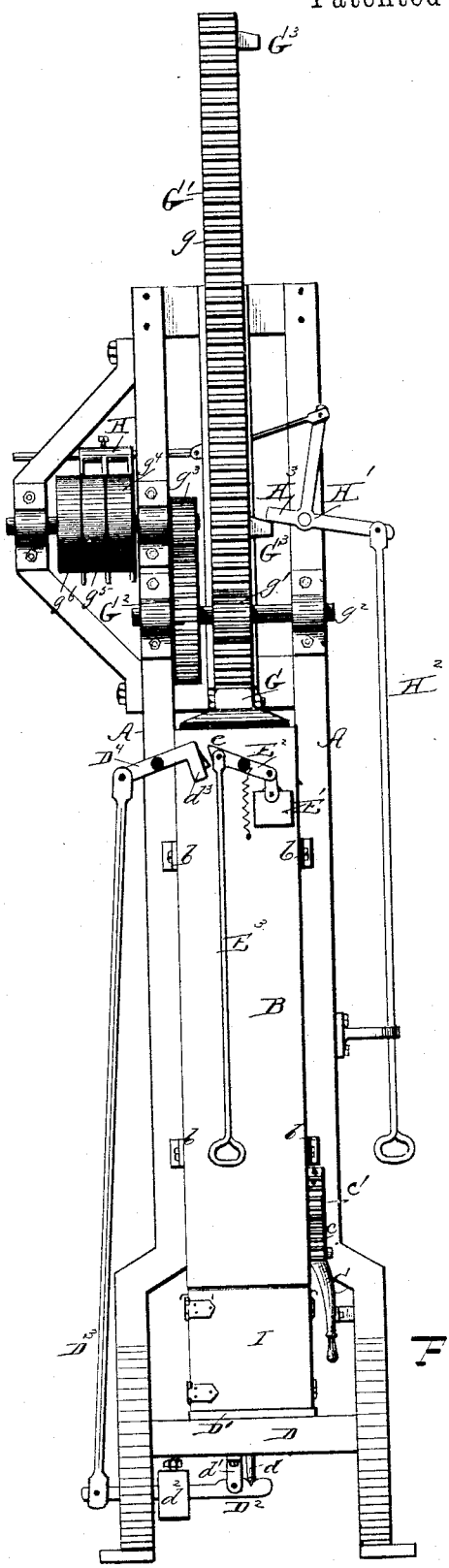
Figure 2:
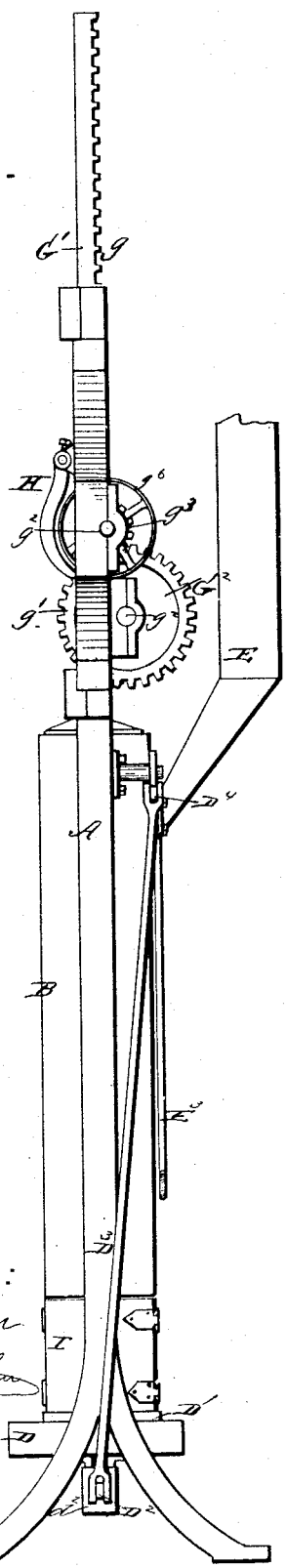
Figure 3:
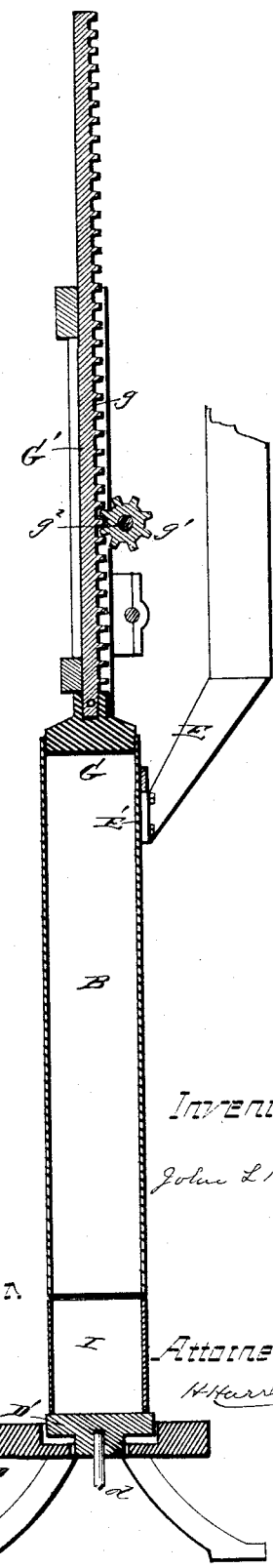

Figure 1 is a front elevation; Fig. 2, a side elevation, and Fig. 3 a central vertical section.

A represents the main frame, which consists of two upright posts, between which is placed a rectangular box, B, provided with guide-lugs $b$ $b$, which clasp the uprights, and with a pivoted lever, C, having a cogged segment, $c$, upon one end meshing with a cogged rack, $c'$, upon one of the uprights, by means of which the box may be raised or lowered a short distance, as will be presently explained.

Below the box B, upon the frame, is a platform, D, having a movable plate, D', provided with a pin, $d$, running down through the platform and resting upon a scale beam or lever, $D^2$, as seen in Fig. 1. This lever is pivoted in a bracket, $d'$, below the platform, and has a movable weight, $d^2$, upon it, and may, if desired, be marked with a series of graduations, in order to weigh any desired amount of bran before being packed. The outer end of this lever is connected by a rod, $D^3$, with a lever, $D^4$, fulcrumed on the side frame of the device, and having its inner end formed or provided with a projection or catch, $d^3$, as shown in Fig. 1.

The box B is provided on one side, near its upper end, with a feed-spout or hopper, E, having a gate-valve, E', which is operated by a lever, $E^2$, and a hand-rod, $E^3$, as shown, the lever having its rear end formed with a beveled nose, $e$, adapted to engage with the catch upon the trigger-lever $D^4$, as will be hereinafter explained.

Secured in guides forming a part of the main frame, above the box B, is a follower or compressing-head, G, the shank G' of which is provided with a row of teeth, $g^2$. This rack-bar is driven by a pinion, $g'$, upon a shaft, $g^2$, journaled on the uprights of the frame, and upon the same shaft is a gear, $G^2$, meshing with a pinion, $g^3$, upon the driving-shaft, which carries three belt-pulleys, $g^4$ $g^5$ $g^6$, one of which (the center one) runs loose upon said shaft. These pulleys are connected by two belts, one of which is crossed with any suitable power.

H represents a belt-shifter connected to one arm of a pivoted lever, H', a second arm of which is connected with a hand-rod, $H^2$, for starting or stopping or reversing the motion. A third arm of the lever $H^3$ is arranged to contact with two lugs, $G^3$, on the side of the vertically-moving rack-bar, and thus shift the belts automatically when the follower is at either end of its stroke.

Between the platform D and the box B is the former I, consisting of a hollow box or cube, the sides of which are hinged together and provided with a suitable latch, in order that the former may be opened out when desired. The former rests upon the scale-plate D', and is preferably provided with small hooks or other devices around its upper edge, for a purpose presently understood.

In operation the former I is placed in position with the binding-wires within it, their ends projecting over its upper edge, and the sacking or material in which the bran is to be compressed placed in the former, and its upper edges secured upon the hooks, as described. The hand-rod $E^3$ is now pulled, opening the gate-valve E', and the lever $E^2$ catching upon the projection $d^3$ and holding the gate raised. When a sufficient amount of bran has entered the apparatus, (say one hundred pounds,) the weight is overcome, the movable platform-plate D' descends sufficient to rest upon the main platform D, and, by its intermediate connections, releases the gate, which is instantly closed by the spiral spring $e$, as seen by Fig. 1. The motor which operates the compressor is then started, and the follower descends, compressing the bran entirely within the former I. When the follower reaches its lowest point, the upper lug, $G^3$, strikes the lever and shifts the belts, reversing the motion of the follower. The box B is now raised by means of the cogged lever C, the sacking and wires brought over the top of the package, and the follower, having now reached its highest point, again shifts the belts and is brought down, to compress and hold the bale while the wire is twisted. The follower then rises again, and is stopped at its highest point, while the bale is removed and the casing and bands for a new one placed in position, and the operation repeated.

Having thus fully described my invention, what I claim as new, and desire to secure by Letters Patent, is—

1. In a bran-compressor, a follower or compressing-head having a rack-bar provided with two lugs, in combination with a lever secured upon the frame, and a belt-shifter connected to said lever, whereby the motion of the follower is automatically reversed, substantially as described and shown.

2. In a bran-compressor, the follower-box B, provided with guide-lugs $b\ b$ and cogged lever C, in combination with the main frame A, having a cogged rack, $c'$, whereby the box may be raised out of the way while tying and removing a package, substantially as shown and described.

3. In a bran-compressor, the main frame A, former I, box B, having a hopper, E, provided with the gate $E'$ and lever E, in connection with the movable platform or scale-plate $D'$, scale beam or lever $D^2$, provided with an adjustable weight, the rod $D^3$, and catch-lever $D^4$, all constructed and arranged to operate substantially as and for the purpose set forth.

4. In a bran-compressor, the main frame A, having a pressing-box, B, the gearing $g'\ g^2\ g^3$, and the driving-shaft provided with the belt-pulleys $g^4\ g^5\ g^6$, in combination with the follower G, having a cogged rack-bar or shank, $G'$, provided with lugs $G^3$, and the lever $H'$, adapted to engage with said lugs, and connected to a belt-shifter, H, whereby the motion of the follower is automatically reversed, substantially as and for the purpose set forth.

5. A bran-compressor consisting, essentially, of the frame A, sliding box or chamber B, removable forming-chamber I, scale $D'\ D^2$, connected to the latch $D^4$, the cut-off gate $E'$ and its lever $E^2$, a train of gearing connecting the driving-pulleys $g^4\ g^5\ g^6$ with the follower, the follower G, cogged rack-bar $G'$, having lugs $G^3$, and the shifting device $H\ H'$, all constructed, combined, and arranged to operate substantially as and for the purpose set forth.

In testimony whereof I affix my signature in presence of two witnesses.

JOHN LIDA KAIL.

Witnesses:
  R. F. JORDAN,
  M. K. RAMSY.